US008695707B2

(12) United States Patent
Li et al.

(10) Patent No.: US 8,695,707 B2
(45) Date of Patent: Apr. 15, 2014

(54) ASPHALTENE REMOVAL COMPOSITION AND METHODS

(75) Inventors: Jack Li, Sugar Land, TX (US); Syed A. Ali, Sugar Land, TX (US); Oscar Bustos, Trophy Club, TX (US); Matthew J. Miller, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

(21) Appl. No.: 12/813,163

(22) Filed: Jun. 10, 2010

(65) Prior Publication Data

US 2010/0314117 A1 Dec. 16, 2010

Related U.S. Application Data

(60) Provisional application No. 61/286,827, filed on Dec. 16, 2009, provisional application No. 61/268,754, filed on Jun. 16, 2009.

(51) Int. Cl.
| | |
|---|---|
| *E21B 37/00* | (2006.01) |
| *E21B 37/06* | (2006.01) |
| *E21B 43/25* | (2006.01) |
| *E21B 43/26* | (2006.01) |
| *E21B 43/27* | (2006.01) |
| *C09K 8/524* | (2006.01) |

(52) U.S. Cl.
USPC .......... 166/304; 134/40; 166/263; 166/308.2; 166/308.4; 166/310; 166/311; 166/312; 166/384; 507/203; 507/242; 507/263; 507/268; 507/905

(58) Field of Classification Search
None
See application file for complete search history.

(56) References Cited

U.S. PATENT DOCUMENTS

| | | | | |
|---|---|---|---|---|
| 2,356,205 | A | * 8/1944 | Blair, Jr. et al. | 507/242 |
| 5,254,175 | A | * 10/1993 | Kaiser | 134/2 |
| 5,292,367 | A | 3/1994 | Bloys et al. | |
| 5,360,787 | A | 11/1994 | Bloys et al. | |
| 6,929,702 | B1 | 8/2005 | Motsenbocker | |
| 7,588,646 | B2 * | 9/2009 | Sherrel et al. | 134/40 |
| 8,043,996 | B2 * | 10/2011 | Harris | 507/90 |
| 2004/0109853 | A1 | 6/2004 | McDaniel | |
| 2004/0145407 | A1 | 7/2004 | Shirasawa et al. | |
| 2006/0112850 | A1 | 6/2006 | Zhang et al. | |

(Continued)

FOREIGN PATENT DOCUMENTS

| | | |
|---|---|---|
| WO | 2007129332 | 11/2007 |
| WO | WO 2007/129348 | * 11/2007 |
| WO | 2010029318 | 3/2010 |
| WO | 2010146514 A1 | 12/2010 |

*Primary Examiner* — George Suchfield
(74) *Attorney, Agent, or Firm* — Jeremy D. Tillman; Rachel Greene; Tim Curington (57) ABSTRACT

This invention relates to compositions and methods of removing an organic deposit including introducing a fluid, wherein the fluid comprises at least two non-polar organic solvents and at least two polar organic solvents; allowing the fluid to dissolve at least a portion of the organic deposit; and removing at least a portion of the fluid. This invention relates to compositions and methods of removing an organic deposit including introducing a fluid, wherein the fluid comprises at least two non-polar organic solvents and at least two polar organic solvents, wherein the non-polar organic solvents comprise aromatic naphtha, terpenes, kerosene, and combination thereof, and wherein the polar solvents comprise heavy aromatic naphtha, cyclohexanone, N-2-methyl pyrrolidone, N-ethyl-2-pyrrolidone, and combination thereof, allowing the fluid to dissolve at least a portion of the organic deposit, and removing at least a portion of the fluid.

23 Claims, 4 Drawing Sheets

(56) References Cited

U.S. PATENT DOCUMENTS

| | | |
|---|---|---|
| 2007/0037001 A1 | 2/2007 | Gao et al. |
| 2007/0062698 A1 | 3/2007 | Smith et al. |
| 2007/0129276 A1 | 6/2007 | Albright et al. |
| 2007/0265231 A1 | 11/2007 | Hofmann et al. |
| 2008/0064730 A1 | 3/2008 | Hofmann et al. |
| 2008/0161403 A1 | 7/2008 | Kordes et al. |
| 2008/0200335 A1 | 8/2008 | Kordes et al. |
| 2008/0293569 A1 | 11/2008 | Kordes et al. |
| 2008/0312085 A1 | 12/2008 | Kordes et al. |
| 2010/0065275 A1* | 3/2010 | McGowen et al. ............ 166/304 |
| 2010/0130384 A1* | 5/2010 | Lightford et al. ................ 507/90 |
| 2010/0130389 A1 | 5/2010 | Lightford et al. |
| 2010/0152069 A1* | 6/2010 | Harris .......................... 507/201 |

* cited by examiner

ASPHALTENE REMOVAL COMPOSITION AND METHODS

This application claims priority to U.S. Provisional Patent Application No. 61/268,754, filed Jun. 16, 2009 and U.S. Provisional patent Application No. 61/286,827, filed Dec. 16, 2009. Both applications are hereby incorporated by reference.

BACKGROUND OF THE INVENTION

1. Field of the Invention

This invention relates to methods and fluids used in treating a subterranean formation. In particular, the invention relates to the preparation and use of an environmentally favorable fluid for use in the removal of deposits containing paraffin and asphaltenes. Also in particular, the invention relates to methods of forming and using the fluids.

2. Description of the Related Art

Various types of fluids are used in operations related to the development and completion of wells that penetrate subterranean formations and to the production of gaseous and liquid hydrocarbons from natural reservoirs. These operations include drilling, perforating, fracturing, modifying the permeability, or controlling the production of sand or water. The fluids employed in these operations are known as drilling fluids, completion fluids, work-over fluids, packer fluids, fracturing fluids, stimulation fluids, conformance or permeability control fluids, wellbore cleanout fluids, gravel pack fluids, consolidation fluids, and the like, and are collectively referred to herein as well treatment fluids.

Over time, as oilfield services introduce these fluids to subterranean formations and as subterranean formations release hydrocarbons for processing, solid or partially solid organic deposits develop along the surfaces of the formation, the wellbore, the screen, the gravel pack, or other equipment used to process the subterranean formation.

Asphaltenes are heterocyclic unsaturated macromolecules consisting primarily of carbon, hydrogen, and minor components such as sulfur, oxygen, nitrogen, and various heavy metals. These high-molecular-weight components of crude oil are in equilibrium under normal reservoir conditions. As crude oil is produced, this equilibrium may be upset by a number of factors, such as $CO_2$ and rich-gas injection, pH shift, pressure drop, shear, streaming potential through porous media and charge metal surfaces, leading to asphaltene deposition.

Asphaltene deposition can occur anywhere in the production life cycle: in the near-wellbore region including perforations, in the tubing, downhole and surface chokes, and surface flowlines. Predicting where asphaltene deposition might occur requires an understanding of the mechanisms for asphaltene deposition. The key causes are pressure decrease and injection of incompatible fluids in the reservoir rocks.

Asphaltene problems can significantly reduce well productivity, causing troublesome operational issues, damaging formations, and decreasing production. The most common asphaltene removal techniques use xylene or xylene mixtures which typically have undesirable health, safety, and environmental characteristics.

Also, paraffin accounts for a significant portion of a majority of crude oils that are greater than 20° API. Paraffin has a straight chain linear structure comprised entirely of carbon and hydrogen. The paraffin with molecules that are larger than $C_{20}H_{42}$ are the components that cause deposition or congealing oil in crude oil systems. Paraffin can deposit from formation pores to the pipeline that deliver oil to the refineries. The deposits vary in consistency from rock hard for the highest chain-length paraffin to very soft, mayonnaise-like congealing oil deposits. Paraffin (wax) is mostly found as a white, odorless, tasteless, waxy solid, with a typical melting point ranges from 47° C. to 64° C. (116.6° F. to 147.2° F.), and a density of around 0.9 $g/cm^3$. It is insoluble in water, but soluble in ether, benzene, and certain esters.

Solvency has been one of the primary methods of removing these deposits. A number of factors can affect the removal of paraffin from production systems. Some of these factors are: solvent used, type of paraffin, quantity of paraffin, temperature and contact time. Any or all of these can help determine success or failure of a paraffin removal treatment.

Different solvents have different abilities to dissolve paraffin. Two general classes of solvents used in the oilfield to dissolve paraffin are aliphatic and aromatic. Common aliphatic solvent used in the oilfield are diesel, kerosene, and condensate. Aromatic solvent used are xylene and toluene. Among all the solvents, xylene and toluene are more effective than aliphatic solvents in removing most of the paraffin deposits. Traditionally, aromatic solvents such as xylene and toluene have been used to remove damaging organic deposits such as asphaltene and paraffin from wellbore tubulars and the formation matrix. However, governmental regulations on the usage, disposal and volatile emission-limits of aromatic solvents are becoming increasingly restrictive. Practically, the flammability, acute toxicity, and environmental contamination concerns have made their use less attractive.

Clearly, a replacement for aromatic solvents in the oilfield is needed that is more logistically and operationally efficient as well as more socially and environmentally responsible. A fluid that is effective, relatively environmentally favorable, and low cost is desirable.

SUMMARY OF THE INVENTION

Embodiments of this invention relate to a method to form and use a treatment fluid. More specifically, embodiments of this invention relate to compositions and methods of removing an organic deposit including introducing a fluid, wherein the fluid comprises at least two non-polar organic solvents and at least two polar organic solvents; allowing the fluid to dissolve at least a portion of the organic deposit; and removing at least a portion of the fluid. Embodiments of this invention relate to compositions and methods of removing an organic deposit including introducing a fluid, wherein the fluid comprises at least two non-polar organic solvents and at least two polar organic solvents, wherein the non-polar organic solvents comprise aromatic naphtha, terpenes, kerosene, and combination thereof, and wherein the polar solvents comprise heavy aromatic naphtha, cyclohexanone, N-2-methyl pyrrolidone, and combination thereof, allowing the fluid to dissolve at least a portion of the organic deposit, and removing at least a portion of the fluid.

DESCRIPTION OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

This invention relates to methods and apparatus to form and use a well treatment fluid for treating subterranean formations. In particular, the invention relates to the use of compositions for removing organic deposits such as asphaltene and/or paraffin deposits from a portion of a wellbore, wellbore tubulars, fracture system, or matrix of a subterranean formation. The compositions include an organic solvent blend, wherein the organic solvent comprises (i) at least two non-polar organic solvents; and (ii) at least two polar organic solvents. Methods are also provided for removing asphaltene and/or paraffin deposits from a portion of a wellbore or a subterranean formation using the compositions.

Non-polar organic solvents include D-limonene, dipentene, diesel, kerosene, naphtha, alpha-pinene, beta pinene, 1-methyl-4-isopropylene-1-cyclohexane and mixtures thereof.

Polar organic solvents include cyclopentanone, cyclohexanol, sulpholane, cyclohexanone, N-methyl-2-pyrrolidone, 2-ethyl pyrrolidone, 2-methylpyrrolidone, N-methylpyrrolidone, propyl pyrrolidone, butyl pyrrolidone, N-methylmorpholine, N-methylformamide, and mixtures thereof.

For example, terpenes are desirable alternatives to aromatic solvents. Terpenes are defined as a group of unsaturated aliphatic cyclic hydrocarbons. Unlike petroleum distillates, they are a renewable resource derived from plant products, such as orange peel and the resinous sap of pine trees. Terpenes are comprised of isoprene units, usually having 5 n carbon atoms and the molecular formula $(C_5H_8)_n$, where n is the number of isoprene units. Common terpenes include: d-limonene (orange peel oil), alpha and beta pinene (PINE-SOL™), turpentine, carotene, camphor oil, citronella, neptalactone (catnip) and menthol (peppermint oil).

Terpenes have good solvency compared to aromatic and chlorinated solvents. Also, they are biodegradable, less toxic and less flammable. When used, either alone or in combination with other solvents (e.g., kerosene) and surfactants, terpenes are excellent substitutes for aromatic solvents in a wide variety of oilfield applications.

Other environmentally favorable polar solvents include: cyclohexanone and N-methyl-2-pyrrolidone. Cyclohexanone is the organic compound with the formula $(CH_2)_5CO$. The molecule consists of six-carbon cyclic molecule with a ketone functional group. This colorless oil has an odor reminiscent of peppermint as well as acetone. Cyclohexanone is not carcinogenic and is only moderately toxic, with a TLV of 25 ppm for the vapor. It is an irritant.

N-methyl-2-pyrrolidone (NMP) has a 5-membered lactam structure. It is a clear to slightly yellow liquid miscible with water and solvents like ethyl acetate, chloroform, benzene and lower alcohols or ketones. It also belongs to the class of dipolar aprotic solvents which includes also dimethylformamide, dimethylacetamide and dimethyl sulfoxide. N-Methyl-2-pyrrolidone and its derivatives are used as intermediates for the synthesis of agrochemicals, pharmaceuticals, textile auxiliaries, plasticizers, stabilizers and specialty inks NMP has desirable properties such as low volatility, low flammability, and relatively low toxicity. Both cyclohexanone and N-methylpyrrolidone are excellent organic polar solvents.

Alternatively, in some embodiments, 1-ethyl-2 pyrrolidone may be combined with or may be replaced by 1-ethyl-2-pyrrolidone (NEP).

One embodiment of the invention uses a composition comprising kerosene, cyclohexanone, d-limonene, and N-2-methylpyrrolidone (NMP) to dissolve asphaltene. Kerosene is present in a concentration of 10-70%. Cyclohexanone is present in a concentration of 0.5 to 20 weight percent. D-limonene is present in a concentration of 10 to 70 weight percent. NMP is present in a concentration of 0.5 to 20 weight percent. In some alternative embodiments, no cyclohexanone is present. In some additional alternative embodiments, no NMP is present. In some additional alternative embodiments, NEP may be present in a concentration of 0.5 to 20 weight percent.

Some embodiments also include an asphaltene inhibitor, such as a polymer/resin-based asphaltene inhibitor. Specifically, some embodiments may include sulfonated alkyl phenol formaldehyde resin, alkyl phenol formaldehyde resin, high molecular weight polyolefin ester, α-olefin/maleic anhydrite copolymer, polyalkylenesuccinimide copolymer, lauryl methacrylate/hydroxyethylmethacrlate copolymer, 4-alkylphenylmethacrylate polymer, 1-vinyl-4-alkyl-2-pyrrolidone polymer, polyvinylalkyl carbamates, polyesteramides, and lignosulfonate polymers. Some embodiments may use a combination of inhibitors.

The inhibitor may be introduced in combination with compositions for removing organic deposits such as asphaltene and/or paraffin deposits at a concentration of about 250 ppm, 500 ppm, and 1000 ppm. In some embodiments, the inhibitor may be introduced in a composition comprising methanol, ethanol, isopropanol, and/or a combination thereof. Some embodiments may also comprise water.

Methods to remove asphaltene and/or paraffin deposits from a portion of equipment or a subterranean formation include matrix acidizing injection, pre-flush of fracturing jobs, and continuous downhole injection. Methods to remove deposits also include the following.

Introducing the composition into a well includes placing in the portion of the well to be treated via production tubing for a sufficient contact time for the organic solvent blend to dissolve a substantial amount of organic deposits (i.e., paraffin and asphaltenes). A soak time may be needed. The method also includes flowing back the composition to the surface through the wellbore after placing the composition and subsequent soak time.

Additionally, coiled tubing with a downhole nozzle may be placed in a portion of a well to be treated. The composition is allowed to soak for a sufficient time for the organic solvent blend to dissolve a substantial amount of organic deposits (i.e., paraffin and asphaltenes). Next, the composition is allowed to flow back to the surface either through the coiled tubing or by circulating it out.

Also, an engineered, high pressure bottom hole assembly such as a JETBLASTER™ (commercially available from Schlumberger Technology Corporation of Sugar Land, Tex.) may be used in combination with a coiled tubing assembly to deliver the composition. The composition is allowed to soak for a sufficient time for the organic solvent blend to dissolve a substantial amount of organic deposits (i.e., paraffin and asphaltenes). Next, the composition is allowed to flow back to the surface either through the coiled tubing or by circulating it out.

In another embodiment, the composition may be injected below the fracturing gradient of a subterranean formation. Right after the injection of the composition, an acid job injected at matrix rates is performed. The composition then works by inhibiting the precipitation of organic deposits due to the rapid cool down of the formation by injecting colder fluids.

In another embodiment, the composition is injected above the fracturing gradient of a subterranean formation. Right after the injection of the composition, an acid fracturing job or hydraulic fracturing job is performed. The composition then works by inhibiting the precipitation of organic deposits due to the rapid cool down of the formation by injecting colder fluids. Also, allowing the composition to have deeper penetration in the reservoir will enhance its inhibition properties.

In another embodiment, the composition is injected continuously through a micro-coiled tubing or a commonly known small diameter pipe like "macaroni" that are permanently installed in wellbores. Continued injection of the composition at downhole conditions will inhibit the precipitation of paraffin and asphaltene on the tubulars.

In some embodiments, a method of removing an organic deposit, comprises introducing a fluid, wherein the fluid comprises at least two non-polar organic solvents and at least two polar organic solvents; allowing the fluid to dissolve at least a portion of the organic deposit; and removing at least a portion of the fluid. In some embodiments, the fluid further comprises an asphaltene inhibitor. In some embodiments, the asphaltene inhibitor comprises a high molecular weight polymeric dispersant formulated in a high flash aromatic solvent. Also, in some embodiments, the deposit comprises asphaltene, paraffin, or both. In some embodiments, the non-polar organic solvents comprise aromatic naphtha, terpenes, kerosene, and combination thereof. In some embodiments, the polar organic solvents enhance the solubility of asphaltenes in the organic solvent blend relative to the solubility of the asphaltenes in non-polar organic solvents. Additionally, in some embodiments, the polar solvents comprise heavy aromatic naphtha, cyclohexanone, N-2-methylpyrrolidone, and combination thereof. In some embodiments, the fluid comprises 10 to 70 weight percent kerosene 0.5 to 20 weight percent cyclohexanone, 10 to 70 weight percent D-limonene, and 0.5 to 20 weight percent NMP. In some embodiments, the fluid comprises 10 weight percent cyclohexanone, 10 weight percent N-methylpyrrolidone, 50 weight percent d-limonene and 30 weight percent kerosene.

In some embodiments, a method of removing an organic deposit comprises introducing a fluid, wherein the fluid comprises at least two non-polar organic solvents and at least two polar organic solvents, wherein the non-polar organic solvents comprise aromatic naphtha, terpenes, kerosene, and combination thereof, and wherein the polar solvents comprise heavy aromatic naphtha, cyclohexanone, N-2-methylpyrrolidone, and combination thereof, allowing the fluid to dissolve at least a portion of the organic deposit, and removing at least a portion of the fluid. In some embodiments, removing at least a portion of the fluid comprises flowing back the fluid to a surface of a subterranean formation through a wellbore. In some embodiments, introducing a fluid comprises placing coiled tubing with a downhole nozzle in a wellbore and flowing the fluid through the coiled tubing. In some embodiments, introducing the fluid further comprises using an engineered, high pressure bottom hole assembly with coiled tubing. Also, in some embodiments, introducing the fluid comprises injecting the fluid below the fracturing gradient of a subterranean formation. Some embodiments may further comprise injecting an acid at matrix rates. In some embodiments, introducing the fluid comprises injecting the fluid above the fracturing gradient of a subterranean formation. In some embodiments, introducing the fluid comprises injecting the fluid continuously through a micro-coiled tubing that is installed in a wellbore.

In some embodiments, a method of removing an organic deposit from a wellbore, comprises introducing a fluid to the wellbore, wherein the fluid comprises at least two non-polar organic solvents and at least two polar organic solvents, wherein the non-polar organic solvents comprise aromatic naphtha, terpenes, kerosene, and combination thereof, and wherein the polar solvents comprise heavy aromatic naphtha, cyclohexanone, N-2-methyl pyrrolidone, and combination thereof, allowing the fluid to dissolve at least a portion of the organic deposit, and removing at least a portion of the fluid, wherein removing at least a portion of the fluid comprises flowing back the fluid to a surface of a subterranean formation through a wellbore. In some embodiments, the fluid comprises 10 to 70 weight percent kerosene 0.5 to 20 weight percent cyclohexanone, 10 to 70 weight percent D-limonene, and 0.5 to 20 weight percent NMP. In some embodiments, introducing a fluid comprises placing coiled tubing with a downhole nozzle in the wellbore and flowing the fluid through the coiled tubing.

In some embodiments, the fluid may have a wide variety of applications as solvent for asphaltene deposits. Some of these include:

Wellbore and tubing clean-out using a standard 4 ports nozzle or Jet Blaster tool.

Cleaning flowlines and tanks.

Formation cleaning.

For wellbore or tubing clean-out, the recommended treatment volume should be calculated based on volume of 150 gal/1000 ft of tubing. If small diameter tubing or coiled tubing is used, the treatment volume should be based on a volume of 75 gal/1000 ft. The fluid can be pumped into the tubing or annulus using either a standard 4-port nozzle or Jet Blaster. Treatment should be allowed to soak for a period of time. Soak time depends on the bottomhole temperature: 4 to 5 hours soak for wells with BHT <100 deg F. and 1 to 2 hours for wells with BHT >100 deg F.

EXAMPLES

The following examples are presented to illustrate the preparation and properties of fluid systems, and should not be construed to limit the scope of the invention, unless otherwise expressly indicated in the appended claims. All percentages, concentrations, ratios, parts, etc. are by weight unless otherwise noted or apparent from the context of their use.

D-limonene-based, wellbore cleaning fluid, paraffin dispersant, and xylene were evaluated along with cyclohexanone and N-methylpyrrolidone.

The laboratory investigation of alternative solvent systems for removal of asphaltene deposits is summarized. Various chemicals including d-limonene and paraffin dispersant were evaluated along with asphaltene inhibitor (FlowSOLVE™ 112, a high molecular weight polymeric dispersant that is commercially available from JD Horizons of Mobberly, Cheshire, UK). Cyclohexanone and N-methylpyrrolidone were also investigated.

The following experimental procedure was used:
1. The test solution was prepared in a 100-ml beaker with a stir bar and placed on a magnetic-stirrer hot-plate.
2. The solution was heated under hood to 66° C.
3. One gram of asphaltene sample (obtained from Gulf of Mexico) was weighed and wrapped in a KIMWIPE™. Initial weight ($w_i$) was recorded.
4. The KIMWIPE™ containing the asphaletene sample was secured with self-closing forceps and immersed in the test solution for an hour at 66° C. (FIG. 1).
5. The KIMWIPE™ was removed from the solution and the residue was weighed ($w_f$).
6. The percent dissolution was calculated by the following equation:

$$\% \text{ Dissolution} = \frac{(w_i - w_f)}{w_i} \times 100$$

Figure 1A:
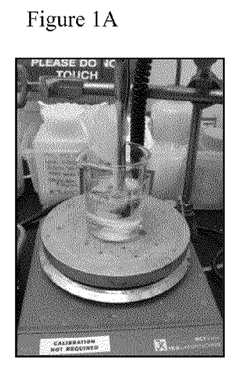
FIGS. 1A and 1B are photographs of lab apparatus as described in the discussion related to the Examples.

Terpene-based systems (e.g., d-limonene), while having much improved health, safety, and environmental characteristics fall short of the benchmark asphaltene-solvency power of toluene or xylene. Tests were conducted to determine whether the addition of small percentages of dispersants, petroleum naphtha, or other polar solvent could enhance the asphaltene-solvency power of terpene-based systems. Various chemicals including d-limonene, paraffin dispersant (ethoxylated alkyl phenol in hydrocarbon solvent), and kerosene were tested along with cyclohexanone and N-methylpyrrolidone. In addition, JD Horizons' asphaltene inhibitor FlowSOLVE™ 112 was also evaluated. FIG. 1A illustrates the apparatus.

Figure 2:
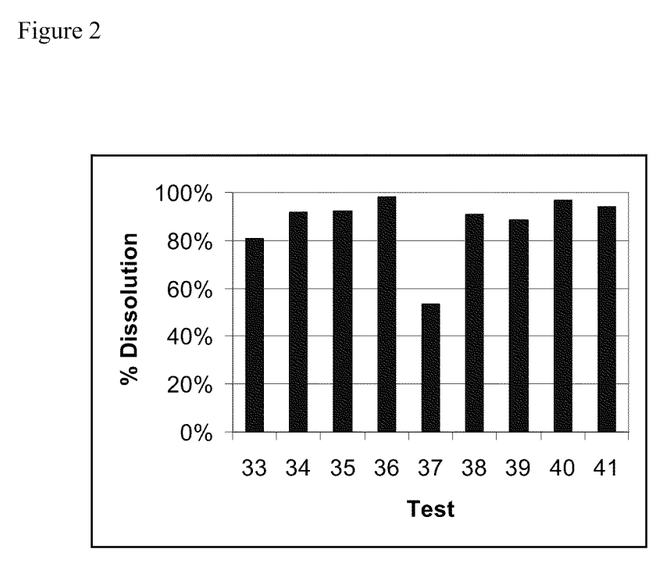
FIG. 2 is a plot of dissolution results with cyclohexanone and N-2-methyl pyrrolidone (NMP) at 66° C.

Table 1 and FIG. 2 summarize dissolution results with cyclohexanone and N-methylpyrrolidone. Greater than 98% dissolution was obtained with both cyclohexanone and N-methylpyrrolidone suggesting that the two different polar solvents enhance asphaltene dissolving power of d-limonene-kerosene mixture. The solvent formulation comprising of 5% cyclohexanone, 5% N-2-methylpyrrolidone, 50% d-limonene and 40% kerosene provide the best results.

TABLE 1

Test formulation and dissolution results with cyclohexanone and N-2-methyl pyrrolidone (NMP) at 66° C.

| Test | kerosene % | d-limonene % | cyclohexanone % | NMP % | dissolution % |
|---|---|---|---|---|---|
| 33 | 45 | 50 | 5 | — | 80.9 |
| 34 | 45 | 50 | — | 5 | 91.7 |
| 35 | 45 | 50 | — | 5 | 92.1 |
| 36 | 40 | 50 | 5 | 5 | 98.1 |
| 38 | 44 | 50 | 3 | 3 | 91.0 |
| 40 | 40 | 50 | 5 | 5 | 96.9 |
| 41 | 42 | 50 | 3 | 5 | 94.1 |

Figure 3:
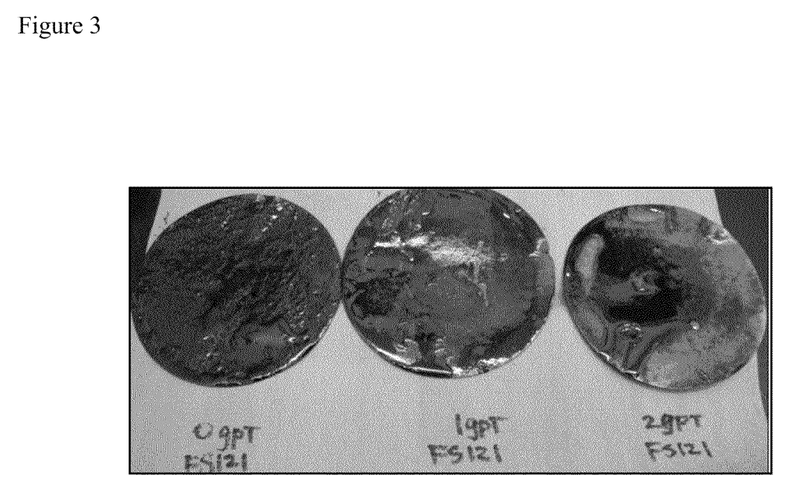
FIG. 3 is a photograph of compatibility tests with Flow-SOLVE™ 112 and Belize crude oil at 66° C. for 30 minutes.

A compatibility test (50% fracturing fluid with FlowSOLVE™ 112+50% Belize crude with 1.61 weight percent asphaltene) showed that FlowSOLVE™ 112 was effective in controlling the precipitation of asphaltenes. FIG. 3 displays the appearance of the filter paper with 0, 1, and 2 percent FlowSOLVE™ 112, respectively, with crude oil after filtration.

Figure 4:
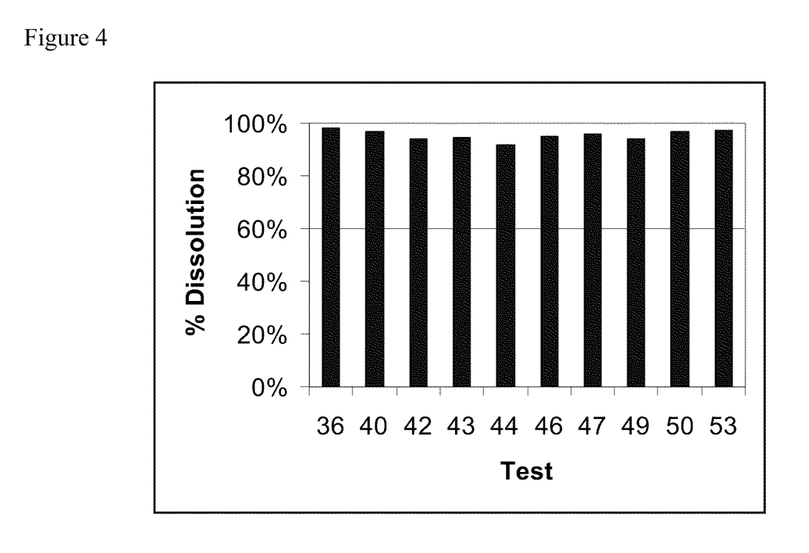
FIG. 4 is a plot of dissolution results with Flow-SOLVE™112 at 66° C.

Additional tests were conducted to determine effect of FlowSOLVE™ 112 on the dissolving power of the optimized solvent formulation (40% kerosene+50% d-limonene+5% cyclohexanone+5% NMP). The results are shown in Table 2 and FIG. 4. Tests 36 and 40 are shown for comparison purposes. The data show that the addition of FlowSOLVE™ 112 decreases the percent dissolution from 97% (Test 40) to 94% (Test 43). Tests 47 and 50 suggest that the effect can be reduced with the use of either paraffin dispersant instead of cyclohexanone or a higher d-limonene concentration. Based on these results, the FlowSOLVE™ 112 has minimal effects on the asphaltene dissolution.

TABLE 2

Test formulation and dissolution results with FlowSOLVE ™ 112 at 66° C.

| Test | Kerosene % | P130 % | U082 % | Cyclohexanone % | NMP % | FlowSOLVE 112% | Dissolution % |
|---|---|---|---|---|---|---|---|
| 36 | 40 | 50 | — | 5 | 5 | — | 98.1 |
| 40 | 40 | 50 | — | 5 | 5 | — | 96.9 |
| 42 | 41 | 50 | — | 4 | 5 | 0.5 | 94.0 |
| 43 | 39.5 | 50 | — | 5 | 5 | 0.5 | 94.4 |
| 44 | 39.9 | 50 | — | 5 | 5 | 0.1 | 91.8 |
| 46 | 39 | 50 | — | 5 | 5 | 1 | 95.0 |
| 47 | 39 | 50 | 5 | — | 5 | 0.5 | 96.0 |
| 49 | 34.5 | 55 | — | 5 | 5 | 0.5 | 94.1 |
| 50 | 29.5 | 60 | — | 5 | 5 | 0.5 | 97.0 |
| 53 | 34.5 | 50 | — | 5 | 10 | 0.5 | 97.1 |

These results illustrate that presence of aromatic or polar solvent is critical for the effective dissolution of asphaltenes. A solvent formulation comprising of 5% cyclohexanone, 5% N-2-methylpyrrolidone (NMP), 50% d-limonene and 40% kerosene resulted in more than 98 percent dissolution of asphaltenes and appears to be highly effective asphaltene dissolver with favorable health, safety, and environmental stewardship characteristics. A solvent formulation comprising of 5% cyclohexanone, 10% NMP, 34.5% kerosene, 50% d-limonene and 0.5% FlowSOLVE™ 112 also appears to be highly effective asphaltene dissolver/inhibitor with favorable health, safety, and environmental stewardship characteristics.

Figure 1B:
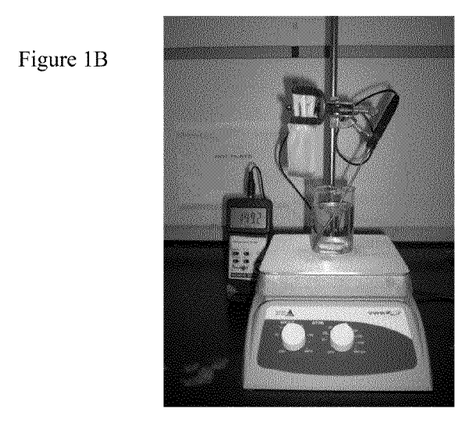

An experimental procedure is detailed below using apparatus as illustrated by FIGS. 1A and 1B:

1. Prepare the test solution in a 100-ml beaker with a stir bar on a hot magnetic stirrer.
2. Start the heater for the stirrer and adjust the final solution temperature to the test temperature.
3. Weigh 1.0 g of candle wax or paraffin sample and wrap in a KIMWIPE™ as illustrated by FIG. 1A. Alternatively, in some embodiments, a bag for brewing tea, such as a LIPTON™ Tea Bag may used instead of a KIMWIPE™ as illustrated by FIG. 1B. Record initial weight ($w_i$).
4. Hang the KIMWIPE™ with the paraffin sample using a self-closing forceps to prevent the sample falling out of the paper
5. Immerse the sample in the test solution for 1 hour when the temperature reaches the test temperature (FIG. 1).
6. Remove the KIMWIPE™ from the solution and weigh the remained sample ($w_f$).
7. The percent dissolution is calculated by the following equation.

$$\% \text{ Dissolution} = \frac{(w_i - w_f)}{w_i} \times 100$$

At 66° C., all tests produced excellent results with nearly 100% dissolution (Table 3) of either candle wax or paraffin sample (Petrobras Cotton Wood paraffin from Pig Trap) in different solvent packages due to the temperature being above the typical melting point of paraffin. The un-dissolved residue was comprised of formation material tubular rust. At room temperature (20° C.), however, the percent dissolution dropped to 13.2 in 50% xylene after 1 hour (Test 67, Table 4). Likewise, the fluid formulation comprising of 5% cyclohexanone, 5% N-methylpyrrolidone, 50% d-limonene and 40% kerosene exhibited 13.9% dissolution after 3-hour soak time. Higher dissolution (44%) was observed with 6-hour contact time (Test 65).

Table 3 summarizes the paraffin dissolution test results at 38° C. The formulation comprising of 5% cyclohexanone, 5% N-methylpyrrolidone, 50% d-limonene and 40% kerosene exhibited similar dissolution results (87%) compared to 100% xylene (91%). Nearly 100% dissolution was achieved as the concentration of cyclohexanone and N-methylpyrrolidone increased to 10% in the final formulation (Test 78, Table 5).

TABLE 3

Test formulation and dissolution results using candle or field wax sample at 66° C.

| Test | Sample | Xylene % | Kerosene % | d-limonene % | Dispersant % | Cyclohexanone % | NMP % | Dissolution % |
|---|---|---|---|---|---|---|---|---|
| 48 | Candle | — | 40 | 50 | 5 | — | 5 | 99.5% |
| 54 | Field | — | 40 | 50 | 5 | — | 5 | 97.1% |
| 55 | Field | — | 40 | 50 | — | 5 | 5 | 99.1% |
| 56 | Field | 100 | — | — | — | — | — | 99.0% |
| 57 | Field | 50 | 50 | — | — | — | — | 99.0% |
| 58 | Candle | 50 | 50 | — | — | — | — | 100.0% |
| 59 | Candle | — | 50 | 50 | — | — | — | 100.0% |
| 60 | Candle | — | 90 | 10 | — | — | — | 100.0% |
| 61 | Candle | — | 100 | — | — | — | — | 100.0% |
| 62 | Field | — | 100 | — | — | — | — | 98.2% |

TABLE 4

Test formulation and dissolution results using candle wax at 20° C.

| Test | Time Hr | Xylene % | Kerosene % | d-limonene % | Dispersant % | Cyclohexanone % | NMP % | Dissolution % |
|---|---|---|---|---|---|---|---|---|
| 63 | 1 | — | 100 | — | — | — | — | 4.4% |
| 64 | 1 | — | 50 | 50 | — | — | — | 13.4% |
| 65 | 3 | — | 40 | 50 | — | 5 | 5 | 13.9% |
|  | 5 |  |  |  |  |  |  | 33.7% |
|  | 6 |  |  |  |  |  |  | 43.6% |
| 66 | 1 | — | 40 | 50 | 5 | — | 5 | 3.3% |
| 67 | 1 | 50 | 50 | — | — | — | — | 13.2% |
| 68 | 1 | — | 30 | 50 | — | 10 | 10 | 2.7% |

TABLE 5

Test formulation and dissolution results using candle wax at 38° C.

| Test | Xylene % | Kerosene % | d-limonene % | Cyclohexanone % | NMP % | Dissolution % |
|---|---|---|---|---|---|---|
| 69 | 50 | 50 | — | — | — | 84.2% |
| 71 | — | 100 | — | — | — | 46.5% |
| 72 | — | 50 | 50 | — | — | 75.2% |
| 73 | — | 40 | 50 | 5 | 5 | 87.0% |
| 74 | 100 | — | — | — | — | 91.5% |
| 78 | — | 30 | 50 | 10 | 10 | 99.1% |

These results illustrate that presence of aromatic or polar solvent is critical for the effective dissolution of paraffins. A solvent formulation comprising of 5% cyclohexanone, 5% N-2-methylpyrrolidone (NMP), 50% d-limonene and 40% kerosene exhibited less than 10% paraffin dissolution after 3 hours which is similar to formulation comprising of 50% xylene and 50% kerosene after 1 hour at 20° C. At 66° C., all solvent packages exhibited 100% dissolution of either candle wax or paraffin sample (Petrobras Cotton Wood paraffin from Pig Trap) due to the test temperature being above the typical melting point of paraffin. Solvent formulation with favorable health, safety, and environmental characteristics comprising of 5% cyclohexanone, 5% N-methyl pyrrolidone, 50% d-limonene and 40% kerosene exhibited similar dissolution results (87%) compared to 100% xylene (91%) at 38° C. Solvent formulation with favorable health, safety, and environmental characteristics comprising of 10% cyclohexanone, 10% N-methylpyrrolidone, 50% d-limonene and 30% kerosene exhibited nearly 100% dissolution at 38° C.

In an additional experiment, a composition comprising 50% d-Limonene, 30% kerosene, 10% cyclohexanone, and 10% N-ethyl-2-pyrrolidone (NEP) was tested. The results of the solubility testing are shown in Table 6.

TABLE 6

Solubility test at 150° F. for 1 hour

| Asphaltene Sample | % Asphaltene Dissolved |
|---|---|
| American Gilsonite Co., Mine site, Bonanza, Utah | 100% |
| American Gilsonite Co., Mine site, Bonanza, Utah | 100% |
| TXCO Heavy Oil Project Mine Site | 100% |
| TXCO Heavy Oil Project Mine Site | 100% |
| Venezuela Asphaltene | 100% |
| Venezuela Asphaltene | 100% |

Additionally, the composition was tested for compatibility with polymers often used in the oil field services industry. The results are presented in the following chart.

| Description | % Mass Increase @ 3 hours | % Mass Increase @ 24 hours | % Mass Increase @ 120 hours | 120 Hours | | |
|---|---|---|---|---|---|---|
| | | | | % Thickness Increase | % Height Increase | % Diameter Increase |
| Backup ring or Female adapter (PEEK lighter color) | 0% | 0% | 0% | 0% | 0% | 0% |
| Seal ring or Pressure Seal (Carbon Impregnated teflon) | 0% | 0% | 0% | 1% | 0% | 0% |
| From bottom to top header ring (HBN Hydrogenated Buna-n) | 4% | 12% | 29% | 10% | 10% | 10% |
| Quad ring that seals the packing nut (looks like o-ring only squarish) | 4% | 11% | 28% | 34% | 7% | 7% |
| Discharge valve - the polyurathane bonded insert | 0% | 0% | 0% | — | — | 0% |
| Butterfly valve insert for a 2 inch valve (normally 4 or 5 inch), Buna-n. | 2% | 5% | 9% | 6% | 3% | 2% |
| Seal for treating iron union connection - 3" 1502 Buna-n | 6% | 16% | 29% | 17% | 7% | 12% |
| Seal for treating iron union connection - 2" 1502 Buna-n | 6% | 17% | 36% | 15% | 2% | 11% |

Some additional methods and apparatus were used to confirm the properties of the fluid.

Crucible Method
1. Place a weighed amount of crude oil or sludge in a Gooch crucible filled with 100-mesh sand supported by steel wool.
2. Wash the sample with heptane on a suction filter until there is no further incremental weight loss (i.e., <0.1 g change). Remove any residual heptanes using air suction, and follow by drying in a 150 to 212 deg F. (65 to 100° C.) oven.
3. Place the dried crucible containing the washed sample of asphaltenes into a 100-mL beaker and fill the beaker with 40 mL of solvent. Adjust the solvent volume to ensure that the entire sample and its sand support are submerged. Leave the sample static in the solvent for 5 minutes.
4. Take the crucible with the sample from the solvent and place it on a suction filter. Pour the extraction solvent through the crucible. Follow the solvent with 20 mL of methanol to carefully wash out residual solvent. Continue suctioning until dry and at constant weight (<0.1-g change).
5. Determine the asphaltene weight loss by subtracting the weight measured in step 4 from that in step 2.
6. Repeat steps 1 through 5 for each solvent.

Additive Compatibility Test Procedure
The following procedure were used to determine the compatibility of the fluid with surfactants and mutual solvents:

1. Add 50 ml of the fluid solution to a 100-ml glass jar.
2. Add a required of the test additive to the fluid and shake the mixture vigorously for 30 second.
3. Place the glass jar in water bath set at 150 deg F. for 30 minutes.
4. Observe the fluid and additive mixture for any incompatibility such as, turbidity, precipitation or phase separation.

Photographs illustrate that the fluid was effective with the additives.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of removing an organic deposit, comprising:
    introducing a fluid, wherein the fluid comprises at least one non-polar organic solvent and at least two polar organic solvents, and wherein the fluid does not contain water;
    allowing the fluid to dissolve at least a portion of the organic deposit; and
    removing at least a portion of the fluid.

2. A method of removing an organic deposit, comprising:
    introducing a fluid, wherein the fluid comprises at least two non-polar organic solvents and at least two polar organic solvents, and wherein the fluid does not contain water;
    allowing the fluid to dissolve at least a portion of the organic deposit; and
    removing at least a portion of the fluid.

3. The method of claim 2, wherein the fluid further comprises an asphaltene inhibitor.

4. The method of claim 3, wherein the asphaltene inhibitor comprises a high molecular weight polymeric dispersant formulated in a high flash aromatic solvent.

5. The method of claim 3, wherein the asphaltene inhibitor comprises sulfonated alkyl phenol formaldehyde resin, alkyl phenol formaldehyde resin, high molecular weight polyolefin ester, α-olefin/maleic anhydrite copolymer, polyalkylenesuccinimide copolymer, lauryl methacrylate/hydroxyethylmethacrylate copolymer, 4-alkylphenylmethacrylate polymer, 1-vinyl-4-alkyl-2-pyrrolidone polymer, polyvinylalkyl carbamates, polyesteramides, lignosulfonate polymers and/or a combination thereof.

6. The method of claim 2, wherein the deposit comprises asphaltene, paraffin, or both.

7. The method of claim 2, wherein the non-polar organic solvents comprise aromatic naphtha, terpenes, kerosene, and combination thereof.

8. The method of claim 2, wherein the polar organic solvents enhances the solubility of asphaltenes in the organic solvent blend relative to the solubility of the asphaltenes in non-polar organic solvents.

9. The method of claim 2, wherein the polar solvents comprise heavy aromatic naphtha, cyclohexanone, N-2-methylpyrrolidone, N-ethyl-2-pyrrolidone, or combination thereof.

10. The method of claim 2, wherein the fluid comprises 10 to 70 weight percent kerosene 0.5 to 20 weight percent cyclohexanone, 10 to 70 weight percent D-limonene, and 0.5 to 20 weight percent N-ethyl-2-pyrrolidone.

11. A method of removing an organic deposit, comprising:
    introducing a fluid, wherein the fluid comprises at least two non-polar organic solvents and at least two polar organic solvents,
    wherein the fluid does not contain water,
    wherein the non-polar organic solvents comprise aromatic naphtha, terpenes, kerosene, and combination thereof, and
    wherein the polar solvents comprise heavy aromatic naphtha, cyclohexanone, N-2-methylpyrrolidone, N-ethyl-2-pyrrolidone, or combination thereof;
    allowing the fluid to dissolve at least a portion of the organic deposit; and
    removing at least a portion of the fluid.

12. The method of claim 11, wherein removing at least a portion of the fluid comprises flowing back the fluid to a surface of a subterranean formation through a wellbore.

13. The method of claim 11, wherein introducing a fluid comprises placing coiled tubing with a downhole nozzle in a wellbore and flowing the fluid through the coiled tubing.

14. The method of claim 13, wherein introducing the fluid further comprises a high pressure bottom hole assembly.

15. The method of claim 11, wherein introducing the fluid comprises injecting the fluid below the fracturing gradient of a subterranean formation.

16. The method of claim 15, further comprising injecting an acid at matrix rates.

17. The method of claim 11, wherein introducing the fluid comprises injecting the fluid above the fracturing gradient of a subterranean formation.

18. The method of claim 11, wherein introducing the fluid comprises injecting the fluid continuously through a microcoiled tubing that is installed in a wellbore.

19. A method of removing an organic deposit from a wellbore, comprising:
    introducing a fluid to the wellbore, wherein the fluid comprises at least two non-polar organic solvents and at least two polar organic solvents,
    wherein the fluid does not contain water,
    wherein the non-polar organic solvents comprise aromatic naphtha, terpenes, kerosene, and combination thereof, and
    wherein the polar solvents comprise heavy aromatic naphtha, cyclohexanone, N-2-methylpyrrolidone, N-ethyl-2-pyrrolidone, or combination thereof;
    allowing the fluid to dissolve at least a portion of the organic deposit; and
    removing at least a portion of the fluid,
        wherein removing at least a portion of the fluid comprises flowing back the fluid to a surface of a subterranean formation through a wellbore.

20. The method of claim 19, wherein the fluid comprises 10 to 70 weight percent kerosene 0.5 to 20 weight percent cyclohexanone, 10 to 70 weight percent D-limonene, and 0.5 to 20 weight percent N-ethyl-2-pyrrolidone.

21. The method of claim 19, wherein introducing a fluid comprises placing coiled tubing with a downhole nozzle in the wellbore and flowing the fluid through the coiled tubing.

22. The method of claim 19, wherein the fluid further comprises an asphaltene inhibitor.

23. The method of claim 22, wherein the asphaltene inhibitor comprises sulfonated alkyl phenol formaldehyde resin, alkyl phenol formaldehyde resin, high molecular weight polyolefin ester, α-olefin/maleic anhydrite copolymer, polyalkylenesuccinimide copolymer, lauryl methacrylate/hydroxyethylmethacrlate copolymer, 4-alkylphenylmethacrylate polymer, 1-vinyl-4-alkyl-2-pyrrolidone polymer, polyvinylalkyl carbamates, polyesteramides, lignosulfonate polymers and/or a combination thereof.

* * * * *